(12) United States Patent
Weast et al.

(10) Patent No.: US 7,046,133 B2
(45) Date of Patent: May 16, 2006

(54) BRAKE LIGHT CIRCUIT FOR ENGINE RETARDER

(76) Inventors: Butch Weast, 10119 Rockwood Rd., Charlotte, NC (US) 28215; Douglas A. Clark, 116 Underwood Dr., Mount Holly, NC (US) 28120

( * ) Notice: Subject to any disclaimer, the term of this patent is extended or adjusted under 35 U.S.C. 154(b) by 183 days.

(21) Appl. No.: 10/869,689

(22) Filed: Jun. 16, 2004

(65) Prior Publication Data

US 2005/0280525 A1 Dec. 22, 2005

(51) Int. Cl.
*B60Q 1/50* (2006.01)
(52) U.S. Cl. .............. 340/467; 340/438; 340/441; 340/479
(58) Field of Classification Search ............. 340/467, 340/438, 441, 479
See application file for complete search history.

(56) References Cited

U.S. PATENT DOCUMENTS

| | | | | |
|---|---|---|---|---|
| 4,235,320 A | * | 11/1980 | Polak et al. ............. | 192/3.34 |
| 4,355,605 A | * | 10/1982 | Robinson et al. ........... | 123/320 |
| 4,592,319 A | * | 6/1986 | Meistrick .................... | 123/321 |
| 5,839,534 A | * | 11/1998 | Chakraborty et al. ....... | 180/169 |
| 6,279,550 B1 | * | 8/2001 | Bryant ..................... | 123/559.1 |

* cited by examiner

*Primary Examiner*—Daryl C Pope
(74) *Attorney, Agent, or Firm*—Adams Evans P.A.

(57) ABSTRACT

A brake warning apparatus for a vehicle having a motor brake retarder system for warning a trailing vehicle the motor brake retarder system is activated and the vehicle is decelerating. The motor brake retarder system having a plurality of retarders disposed on respective cylinders of a motor of a vehicle for imposing a braking function to the respective cylinders of the motor, each retarder electrically connected to an electronic control module by one of a plurality of control leads. The brake warning apparatus includes an electrical interface electrically connected to each one of the plurality of respective control leads for receiving a control signal from the electronic control module. The brake warning apparatus also includes a brake warning switch for receiving the control signal from the electrical interface and in response to the control signal passing an electrical current to the brake warning light.

11 Claims, 2 Drawing Sheets

BRAKE LIGHT CIRCUIT FOR ENGINE RETARDER

TECHNICAL FIELD AND BACKGROUND OF THE INVENTION

This invention relates to an apparatus for providing a warning signal to trailing vehicles that the motor brake retarder (engine retarder) of a forward vehicle has been activated and the vehicle is decelerating.

Rear end collisions present a serious safety issue on our public highways. Rear end collisions are caused by several factors, such as not paying attention and not receiving a warning that the forward vehicle is decelerating. The present invention addresses the latter. Until now, there has not been a device that interfaces with an existing motor brake retarder system for providing a warning signal to trailing vehicles when the motor brake retarder of the forward vehicle has been activated, causing the vehicle to decelerate.

The prior art is replete with devices that turn on a warning light when a vehicle is decelerating. These devices operate through the use of a switch connected to the accelerator pedal. When the accelerator is released, the switch sends a signal to an indicator light such as a brake light. However, these inventions are designed for vehicles that do not have a motor brake retarder. In addition, these inventions can be confusing to trailing vehicles since a warning light is activated every time the accelerator is released regardless of whether the vehicle is actually decelerating, creating a false sense of security so that an activation of the warning light when the vehicle is actually decelerating is ignored or an appropriate response is delayed.

For example, U.S. Pat. No. 4,223,649 to Robinson et al. describes a motor brake control system with warning lights that operate with a motor brake retarder to indicate that the vehicle is decelerating. However, the system described in Robinson et al. is activated by the release of the accelerator pedal and not by the motor brake retarder itself. When the operator removes his foot from the accelerator, the motor brake retarder and the warning lights are activated. If the operator turns the motor brake retarder off and releases the accelerator pedal, the warning lights are still activated giving the trailing vehicle a false indication of the forward vehicle's deceleration.

The present invention addresses these problems by providing a brake warning apparatus that only activates when a motor brake retarder is being used. Thus, eliminating false warnings of deceleration.

SUMMARY OF THE INVENTION

Therefore, it is an object of the invention to provide a brake warning apparatus that interfaces with an existing motor brake retarder system.

It is another object of the invention to provide a brake warning apparatus that operates when a motor brake retarder is activated.

It is another object of the invention to provide a brake warning apparatus that operates with any degree of motor brake retardation.

It is another object of the invention to provide a brake warning apparatus that provides accurate deceleration warning signals and eliminates false warning signals to a trailing vehicle.

These and other objects of the present invention are achieved in the preferred embodiments disclosed below by providing in a motor brake retarder system having a plurality of retarders disposed on respective cylinders of a motor of a vehicle for imposing a braking function to the respective cylinders of the motor, each retarder being electrically connected to an electronic control module by one of a plurality of respective control leads, the improvement including a brake warning apparatus for activating a vehicle brake warning light to indicate deceleration. The brake warning apparatus including an electrical interface electrically connected to each one of the plurality of respective control leads for receiving a control signal from the electronic control module; and a brake warning switch electrically connected between the electrical interface and the brake warning light for receiving the control signal from the electrical interface and in response to the control signal passing an electrical current to the brake warning light.

According to another preferred embodiment of the invention, the motor brake retarder system further includes a master switch for turning the motor brake retarder system on.

According to another preferred embodiment of the invention, the master switch has a plurality of positions for selectively varying the degree of braking imposed on the motor by the motor brake retarder system in response to an operator-selected degree of braking.

According to another preferred embodiment of the invention, the electrical interface includes a flow prevention means for preventing the control signal from flowing from the electrical interface to the plurality of respective control leads.

According to another preferred embodiment of the invention, the flow prevention means is a diode.

According to another preferred embodiment of the invention, the brake warning switch is a relay.

According to another preferred embodiment of the invention, in a motor brake retarder system having a plurality of retarders disposed on respective cylinders of a motor of a vehicle for imposing a braking function to the respective cylinders of the motor, each retarder being electrically connected to an electronic control module by one of a plurality of respective control leads, the improvement including a brake warning apparatus for activating a vehicle brake warning light to indicate deceleration. The brake warning apparatus including an electrical interface having a plurality of interface leads electrically connected to respective ones of the control leads for receiving a control signal from the electronic control module; and a brake warning switch electrically connected between the electrical interface and the brake warning light for receiving the control signal from the electrical interface and in response to the control signal passing an electrical current to the brake warning light.

According to another preferred embodiment of the invention, the motor brake retarder system further includes a master switch having a plurality of positions for selectively varying the degree of braking imposed on the motor by the motor brake retarder system in response to an operator-selected degree of braking.

According to another preferred embodiment of the invention, the electrical interface includes at least one flow prevention means for each one of the plurality of interface leads for preventing the control signal from flowing from the electrical interface to respective ones of the control leads.

According to another preferred embodiment of the invention, the at least one flow prevention means is a diode.

According to another preferred embodiment of the invention, the brake warning switch is a relay.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
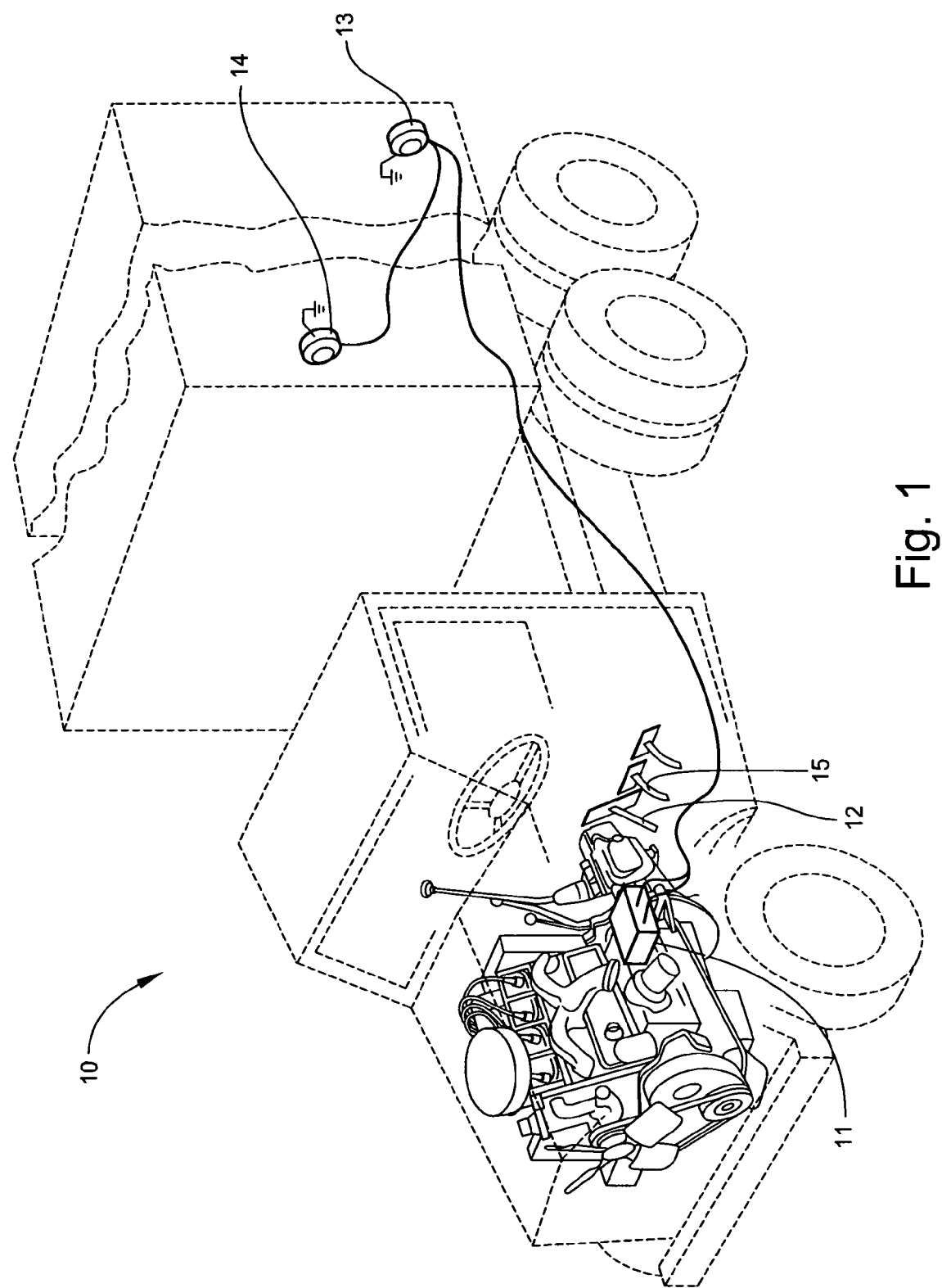
FIG. 1 shows a perspective view of a truck with a motor brake retarder and a brake warning apparatus according to an embodiment of the invention.

Referring now specifically to the drawings, a truck with a brake warning apparatus 11 of the present invention is illustrated in FIG. 1 and shown generally at reference numeral 10.

The brake warning apparatus 11 of the present invention is designed to work with vehicles equipped with motor brake retarders. Motor brake retarders are typically used on heavy-duty vehicles such as trucks and buses. The motor brake retarder allows the driver to maintain a safer vehicle speed control in various conditions, from flatlands to steep downhill descents. The motor brake retarder provides vehicle speed control by using the engine to aid in slowing and controlling the vehicle. The motor brake retarder converts a power-producing engine into a power-absorbing retarding mechanism by modifying the timing of the exhaust valves, so that the exhaust valves open near the top dead center (TDC) of the compression stroke.

The motor brake retarder is controlled by the operator of the vehicle. The operator can turn the motor brake retarder off or on at will and can select the degree of retardation to be used, depending on the slope and type of load being carried. Thus, for a six cylinder engine, the operator can retard two cylinders, four cylinders, or all six cylinders depending on the degree of retardation required. In the event that no retardation is required, the operator can shut the motor brake retarder system completely off.

Figure 2:
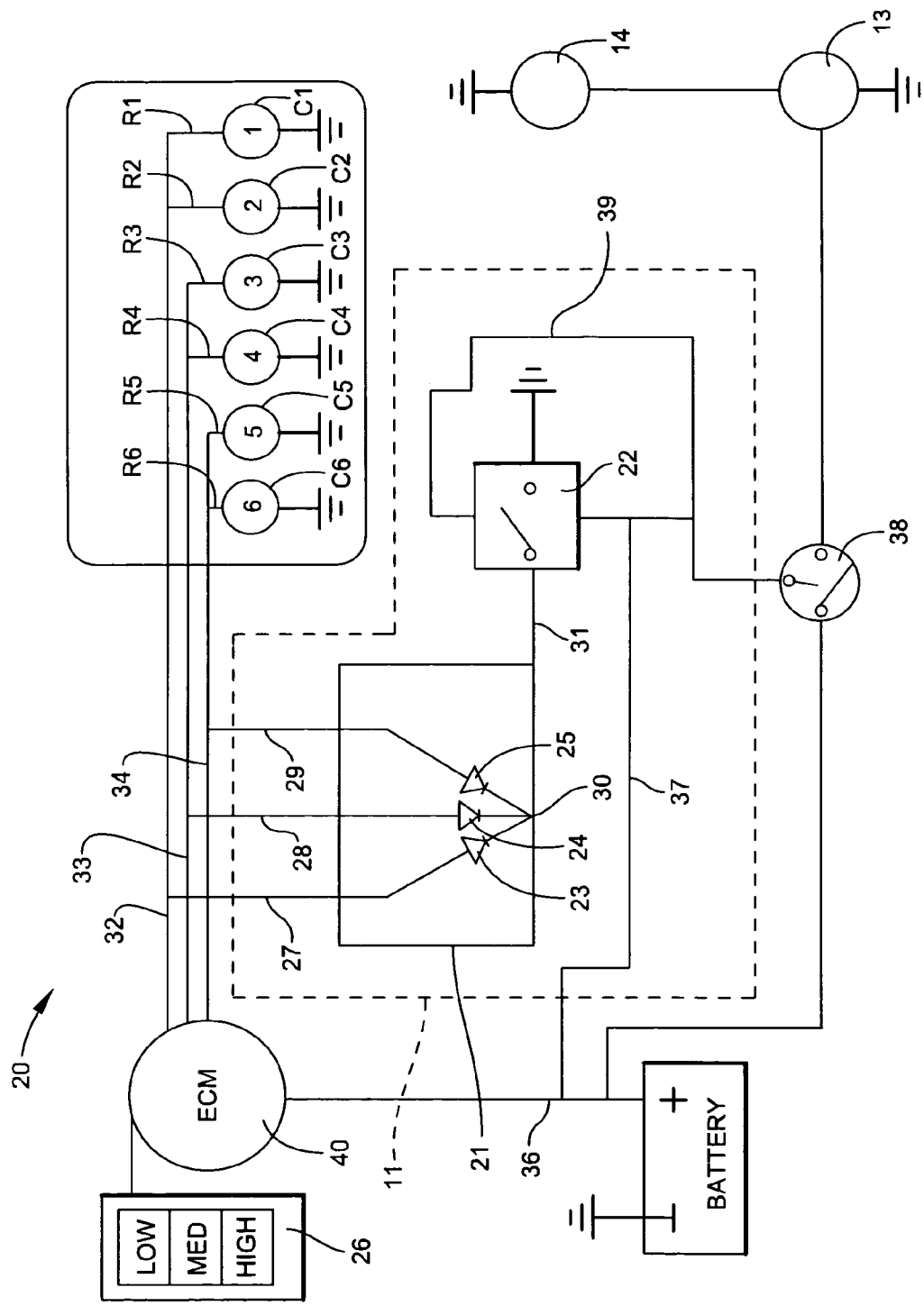
FIG. 2 shows an electrical schematic of the brake warning apparatus.

The brake warning apparatus 11 is connected to the existing motor brake retarder system, see FIG. 2, to provide a trailing vehicle with accurate information regarding the deceleration of a forward vehicle due to the activation of the motor brake retarder. Unlike the prior art systems, the brake warning apparatus 11 is not connected to an accelerator pedal 12. This prevents false warning signals from being transmitted to a trailing vehicle by the release of the accelerator pedal 12 which may or may not cause a deceleration of the vehicle. Whenever the motor brake retarder is activated, the brake warning apparatus 11 sends a signal to a vehicle's brake lights 13 and 14. However, any type of warning light may be used to warn trailing vehicles that the forward vehicle is decelerating.

FIG. 2 shows an electrical schematic of a motor brake retarder system, shown generally at 20, with a brake warning apparatus 11 installed. The brake warning apparatus 11 includes an electrical interface 21 and a brake warning switch 22, hereinafter referred to as a relay switch, such as Siemens Model No. 896H1CHD. The electrical interface 21 includes three diodes 23, 24, and 25 and three interface leads 27, 28, and 29 for connection to the existing motor brake retarder system 20. The diodes 23, 24, and 25 provide a flow prevention means by permitting electrical current to flow from the motor brake retarder system 20 to the relay switch 22 while preventing the electrical current from returning to the motor brake retarder system 20.

The three interface leads 27, 28, and 29 are connected to the existing motor brake retarder system 20 and join together at junction point 30 for connection to the relay switch 22 via lead 31. The relay switch 22 is connected to a main power lead 36 of the truck via lead 37 and connected to a brake light switch 38 via lead 39.

The brake warning apparatus 11 only functions when the motor brake retarder system 20 is active. As discussed above, the operator can control the motor brake retarder system 20 by selecting the degree of retardation or he can turn the system completely off. Thus, the operation of the brake warning apparatus 11 will be discussed accordingly.

The motor brake retarder system 20 is activated first by a master switch 26 controlled by the operator of the vehicle and second by the accelerator pedal 12. For illustration purposes, a three position (low/medium/high) master switch will be discussed. Once the master switch 26 is turned on and the degree of retardation is selected, the operator simply releases the accelerator pedal 12 to activate the motor brake retarder system 20. When the operator releases the accelerator pedal 12, a control signal is transmitted from an electronic control module (ECM) 40 to provide braking to the selected cylinders. However, if the motor brake retarder system 20 is not turned on, releasing the accelerator pedal 12 will not activate the motor brake retarder system 20. Thus, the release of the accelerator pedal 12 will not activate the brake warning apparatus 11.

When the operator decides to retard 2 cylinders, the master switch 26 is set by the operator to the low position. When the motor brake retarder system 20 is activated, the ECM 40 transmits a control signal via control lead 32 to corresponding motor brake retarders R1 and R2 for cylinders C1 and C2. Accordingly, control signal is transmitted to the interface 21 via interface lead 27. Diodes 24 and 25 prevent the control signal from being transmitted back to control leads 33 and 34 of the existing motor brake retarder system 20 via interface leads 28 and 29 resulting in motor brake retarders R3, R4, R5, and R6 being turned on for cylinders C3, C4, C5, and C6. The control signal is then transmitted to the relay switch 22 via lead 31. The relay switch 22 closes and passes an electrical current to the brake light switch 38 via lead 39, closing the brake light switch 38 and turning on the brake lights 13 and 14.

When the operator decides to retard 4 cylinders, the master switch 26 is set by the operator to the medium position. When the motor brake retarder system 20 is activated, the ECM 40 transmits a control signal via control leads 32 and 33 to the corresponding motor brake retarders R1, R2, R3, and R4 for cylinders C1, C2, C3, and C4. Accordingly, the control signal is transmitted to the interface 21 via interface leads 27 and 28. Diode 25 prevents the control signal from being transmitted back to control lead 34 of the existing motor brake retarder system 20 via interface lead 29 resulting in the motor brake retarders R5 and R6 being turned on for cylinders C5 and C6. The control signal is then transmitted to the relay switch 22 via lead 31. The relay switch 22 closes and passes an electrical current to the brake light switch 38 via lead 39, closing the brake light switch 38 and turning on the brake lights 13 and 14.

When the operator decides to retard all 6 cylinders, the master switch 26 is set by the operator to the high position. When the motor brake retarder system 20 is activated, the ECM 40 transmits a control signal to all of the motor brake retarders R1, R2, R3, R4, R5, and R6 via control leads 32, 33, and 34 for cylinders C1, C2, C3, C4, C5 and C6.

Accordingly, the control signal is transmitted to the interface 21 via interface leads 27, 28, and 29. The control signal is then transmitted to the relay switch 22 via lead 31. The relay switch 22 closes and passes an electrical current to the brake light switch 38 via lead 39, closing the brake light switch 38 and turning on the brake lights 13 and 14.

In the event the operator applies pressure to a brake pedal 15, the brake light switch 38 will transmit electrical current independently of the brake warning apparatus 11. Thus, the current transmitted to the brake light switch 38 as a result of depressing the brake pedal 15 takes priority over the electrical current transmitted by the brake warning apparatus 11.

A brake warning apparatus for vehicles having a motor brake retarder is described above. Various details of the invention may be changed without departing from its scope. Furthermore, the foregoing description of the preferred embodiments of the invention and the best mode for practicing the invention are provided for the purpose of illustration only and not for the purpose of limitation, the invention being identified in the claims.

We claim:

1. In a motor brake retarder system having a plurality of retarders disposed on respective cylinders of a motor of a vehicle for imposing a braking function to the respective cylinders of the motor, each retarder being electrically connected to an electronic control module by one of a plurality of respective control leads, the improvement comprising a brake warning apparatus for activating a vehicle brake warning light to indicate deceleration, including:
   (a) an electrical interface electrically connected to each one of the plurality of respective control leads for receiving a control signal from the electronic control module; and
   (b) a brake warning switch electrically connected between the electrical interface and the brake warning light for receiving the control signal from the electrical interface and in response to the control signal passing an electrical current to the brake warning light.

2. The motor brake retarder system according to claim 1, and further comprising a master switch for turning the motor brake retarder system on.

3. The motor brake retarder system according to claim 2, wherein the master switch has a plurality of positions for selectively varying the degree of braking imposed on the motor by the motor brake retarder system in response to an operator-selected degree of braking.

4. The motor brake retarder system according to claim 1, wherein the electrical interface includes a flow prevention means for preventing the control signal from flowing from the electrical interface to the plurality of respective control leads.

5. The motor brake retarder system according to claim 4, wherein the flow prevention means is a diode.

6. The motor brake retarder system according to claim 1, wherein the brake warning switch is a relay.

7. In a motor brake retarder system having a plurality of retarders disposed on respective cylinders of a motor of a vehicle for imposing a braking function to the respective cylinders of the motor, each retarder being electrically connected to an electronic control module by one of a plurality of respective control leads, the improvement comprising a brake warning apparatus for activating a vehicle brake warning light to indicate deceleration, including:
   (a) an electrical interface having a plurality of interface leads electrically connected to respective ones of the control leads for receiving a control signal from the electronic control module; and
   (b) a brake warning switch electrically connected between the electrical interface and the brake warning light for receiving the control signal from the electrical interface and in response to the control signal passing an electrical current to the brake warning light.

8. The motor brake retarder system according to claim 7, and further comprising a master switch having a plurality of positions for selectively varying the degree of braking imposed on the motor by the motor brake retarder system in response to an operator-selected degree of braking.

9. The motor brake retarder system according to claim 7, wherein the electrical interface includes at least one flow prevention means for each one of the plurality of interface leads for preventing the control signal from flowing from the electrical interface to respective ones of the control leads.

10. The motor brake retarder system according to claim 9, wherein the at least one flow prevention means is a diode.

11. The motor brake retarder system according to claim 7, wherein the brake warning switch is a relay.

* * * * *